United States Patent
Zhang et al.

(10) Patent No.: US 11,386,327 B2
(45) Date of Patent: Jul. 12, 2022

(54) BLOCK-DIAGONAL HESSIAN-FREE OPTIMIZATION FOR RECURRENT AND CONVOLUTIONAL NEURAL NETWORKS

(71) Applicant: salesforce.com, inc., San Francisco, CA (US)

(72) Inventors: Huishuai Zhang, Palo Alto, CA (US); Caiming Xiong, Mountain View, CA (US)

(73) Assignee: Salesforce.com, inc., San Francisco, CA (US)

( * ) Notice: Subject to any disclaimer, the term of this patent is extended or adjusted under 35 U.S.C. 154(b) by 1070 days.

(21) Appl. No.: 15/983,782

(22) Filed: May 18, 2018

(65) Prior Publication Data

US 2018/0373987 A1    Dec. 27, 2018

Related U.S. Application Data

(60) Provisional application No. 62/508,372, filed on May 18, 2017.

(51) Int. Cl.
| | |
|---|---|
| *G06N 3/08* | (2006.01) |
| *G06N 3/04* | (2006.01) |
| *G10L 15/16* | (2006.01) |
| *G06F 17/16* | (2006.01) |
| *G06F 17/11* | (2006.01) |

(Continued)

(52) U.S. Cl.
CPC .......... *G06N 3/084* (2013.01); *G06F 17/11* (2013.01); *G06F 17/16* (2013.01); *G06N 3/0454* (2013.01); *G06N 3/088* (2013.01); *G06N 5/003* (2013.01); *G06N 7/00* (2013.01); *G06N 3/0445* (2013.01)

(58) Field of Classification Search
CPC ...... G06N 3/084; G06N 3/088; G06N 3/0454; G06N 5/003; G06N 7/00; G06N 3/0445; G06N 3/0481; G06F 17/16; G06F 17/11
USPC ........................................................ 706/1–62
See application file for complete search history.

(56) References Cited

U.S. PATENT DOCUMENTS

| | | | |
|---|---|---|---|
| 9,378,464 B2 * | 6/2016 | Caskey | .................. G06N 3/08 |
| 10,282,663 B2 | 5/2019 | Socher et al. | |
| 10,346,721 B2 | 7/2019 | Albright et al. | |

(Continued)

OTHER PUBLICATIONS

Al-Rfou et al., "Theano: A Python Framework for Fast Computation of Mathematical Expressions," May 9, 2016, pp. 1-19. arXiv:1605.02688v1.

(Continued)

*Primary Examiner* — Brandon S Cole
(74) *Attorney, Agent, or Firm* — Haynes and Boone, LLP

(57) ABSTRACT

Embodiments for training a neural network are provided. A neural network is divided into a first block and a second block, and the parameters in the first block and second block are trained in parallel. To train the parameters, a gradient from a gradient mini-batch included in training data is generated. A curvature-vector product from a curvature mini-batch included in the training data is also generated. The gradient and the curvature-vector product generate a conjugate gradient. The conjugate gradient is used to determine a change in parameters in the first block in parallel with a change in parameters in the second block. The curvature matrix in the curvature-vector product includes zero values when the terms correspond to parameters from different blocks.

20 Claims, 8 Drawing Sheets

(51) Int. Cl.
  *G06N 7/00* (2006.01)
  *G06N 5/00* (2006.01)

(56) References Cited

U.S. PATENT DOCUMENTS

| | | | |
|---|---|---|---|
| 10,467,528 B2* | 11/2019 | Golovashkin | G06N 3/082 |
| 10,713,566 B2* | 7/2020 | He | G06N 3/084 |
| 10,922,611 B2* | 2/2021 | Bello | G06N 5/003 |
| 2014/0067738 A1* | 3/2014 | Kingsbury | G06N 3/08 706/20 |
| 2015/0161987 A1* | 6/2015 | Horesh | G10L 15/16 704/232 |
| 2015/0161988 A1* | 6/2015 | Dognin | G06N 3/08 704/232 |
| 2016/0350653 A1 | 12/2016 | Socher et al. | |
| 2017/0024645 A1 | 1/2017 | Socher et al. | |
| 2017/0032280 A1 | 2/2017 | Socher et al. | |
| 2017/0140240 A1 | 5/2017 | Socher et al. | |
| 2018/0082171 A1 | 3/2018 | Merity et al. | |
| 2018/0096219 A1 | 4/2018 | Socher | |
| 2018/0096241 A1* | 4/2018 | Healey | G06N 3/0445 |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144245 A1* | 5/2018 | Simard | G06N 3/084 |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0336198 A1 | 11/2018 | Zhong et al. | |
| 2018/0336453 A1 | 11/2018 | Merity et al. | |
| 2018/0300400 A1 | 12/2018 | Paulus | |
| 2018/0373682 A1 | 12/2018 | McCann et al. | |
| 2018/0373987 A1* | 12/2018 | Zhang | G06N 3/0454 |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |

OTHER PUBLICATIONS

Amari et al., "Methods of Information Geometry," Book Review, American Mathematical Society, IEEE Transactions on Information Theory, vol. 55, No. 6, Jun. 2009, pp. 2905-2906.

Amari, Shun-ichi "Natural Gradient Works Efficiently in Learning," Neural Computation, vol. 10, Issue 2, Massachusetts Institute of Technology Press Journals, Feb. 15, 1998, pp. 251-276.

Ba et al., "Distributed Second-Order Optimization Using Kronecker-Factored Approximations," Published as a conference paper at International Conference on Learning Representations (ICLR), Feb. 23, 2017, pp. 1-17 (https://jimmylba.github.io/papers/nsync.pdf).

Burney et al., "A Comparison of First and Second Order Training Algorithms for Artificial Neural Networks," World Academy of Science, Engineering and Technology, International Journal of Computer and Information Engineering, vol. 1, No. 1, International Scholarly and Scientific Research & Innovation, 2007, pp. 145-155. (scholar.waset.org/1307-6892/9681).

Byrd et al., "On the Use of Stochastic Hessian Information in Optimization Methods for Machine Learning," Society for Industrial and Applied Mathematics Journal on Optimization, vol. 31, Issue 3, Sep. 22, 2011, pp. 977-995, (https://doi.org/10.1137/10079923X).

Byrd et al., "Sample Size Selection in Optimization Methods for Machine Learning," Math. Program., Series B, No. 134, Springer and Mathematical Optimization Society 2012, Jun. 24, 2012, pp. 127-155.

Chen et al., "Revisiting Distributed Synchronous SGD," Under review as a conference paper at International Conference on Learning Representations (ICLR), Mar. 21, 2017, pp. 1-10. arXiv:1604.00981v3.

Cho et al., "Hessian-free Optimization for Learning Deep Multidimensional Recurrent Neural Networks," to appear at Neural Information Processing Systems (NIPS), Oct. 23, 2015, pp. 1-11. arXiv:1509.03475v2.

Collobert et al., "Large Scale Machine Learning," Doctorate Thesis at the University of Paris VI, Jun. 28, 2004, pp. 1-159. (https://infoscience.epfl.ch/).

Das et al., "Distributed Deep Learning Using Synchronous Stochastic Gradient Descent," Feb. 22, 2016, pp. 1-10. arXiv:1602.06709.

Dauphin et al., "Identifying and Attacking the Saddle Point Problem in High-dimensional Non-convex Optimization," Jun. 10, 2014, pp. 1-14. arXiv:1406.2572.

Dean et al., "Large Scale Distributed Deep Networks," Advances in Neural Information Processing Systems 25 (NIPS Dec. 3, 2012, 9 pages.

Dieleman et al., "Lasagne: First Release" Tutorial documentation at http://lasagne.readthedocs.io/en/latest/user/tutorial.html. Aug. 13, 2015.

Dos Santos et al., "Efficient Second-Order Learning Algorithms for Discrete-Time Recurrent Neural Networks," Chapter 3, L.R. Medsker and L.C. Jain (eds.) Recurrent Neural Networks: Design and Applications, CRC Press, ISBN:0-8493-7181-3, 2001, 29 pages.

Duchi et al., "Adaptive Subgradient Methods for Online Learning and Stochastic Optimization," The Journal of Machine Learning Research, vol. 12, Jul. 2011, pp. 2121-2159.

Gers et al., "Learning Precise Timing with LSTM Recurrent Networks," Journal of Machine Learning Research, vol. 3, Aug. 2002, pp. 115-143. (http://www.jmlr.org/papers/volume3/gers02a/gers02a.pdf).

Grosse et al., "A Kronecker-factored Approximate Fisher Matrix for Convolution Layers," Proceedings of The 33rd International Conference on Machine Learning (ICML), Proceedings of Machine Learning Research (PMLR) vol. 48, May 23, 2016, 34 pages. arXiv:1602.01407v2.

He et al., "Deep Residual Learning for Image Recognition," IEEE Conference on Computer Vision and Pattern Recognition (CVPR), Las Vegas, Nevada, USA, Jun. 26-Jul. 1, 2016, pp. 770-778.

He et al., "Large Scale Distributed Hessian-Free Optimization for Deep Neural Network," Association for the Advancement of Artificial Intelligence (Jan. 15, 2017) pp. 1-6 arXiv:1606.00511v2.

Hochreiter et al., "Long Short-Term Memory," Massachusetts Institute of Technology, Neural Computation, vol. 9 (1997) pp. 1735-1780, pp. 1-46.

Keskar et al., "On Large-Batch Training for Deep Learning: Generalization Gap and Sharp Minima," Published as a conference paper at International Conference on Learning Representations (ICLR), Feb. 9, 2017, pp. 1-16 arXiv:1609.04836v2.

Kingma et al., "Adam: A Method for Stochastic Optimization," Published as a conference paper at International Conference on Learning Representations (ICLR), Jan. 30, 2017, pp. 1-15. arXiv:1412.6980.

Kiros, Ryan, "Training Neural Networks with Stochastic Hessian-Free Optimization," Published as a Conference Paper at International Conference on Learning Representations (ICLR), May 1, 2013, pp. 1-11. arXiv:1301.3641.

Krause, Ben, "Optimizing and Contrasting Recurrent Neural Network Architectures," Computing Research Repository (CoRR) (Oct. 16, 2015) pp. 1-71 arXiv:1510.04953v1.

LeCun et al., "Efficient BackProp," In Neural Networks: Tricks of the Trade (vol. 7700 Lecture No. pp. 9-48). (Lecture Notes in Computer Science (including subseries Lecture Notes in Artificial

(56) References Cited

OTHER PUBLICATIONS

Intelligence and Lecture Notes in Bioinformatics); vol. 7700, 2012, pp. 1-40 DOI: 10.1007/978-3-642-35289-8-3.
LeCun et al., "Gradient-Based Learning Applied to Document Recognition," Proceedings of the Institute of Electrical and Electronics Engineers (IEEE) vol. 86, Issue 11, Nov. 1998, pp. 1-46. (https://www.ieeexplore.ieee.org/document/726791/).
Livieris et al., "A Survey on Algorithms for Training Artificial Neural Networks," Technical Report No. TR08-01 (Sep. 2008) pp. 1-31. (https://www.researchgate.net).
Martens et al., "Deep Learning via Hessian-free Optimization," Appearing in Proceedings of the 27th International Conference on Machine Learning (ICML), Haifa, Isreal (Aug. 13, 2010) pp. 735-742 pp. 1-8 https://dl.acm.org/citation.cfm?id=3104416.
Martens et al., "Learning Recurrent Neural Networks with Hessian-Free Optimization," Appearing in Proceedings of the 28th International Conference on Machine Learning (ICML) Bellevue, WA USA (2011) pp. 1-8 pdfs.semanticscholar.org.
Martens et al., "Optimizing Neural Networks with Kronecker-factored Approximate Curvature," In International Conference on Machine Learning (ICML), Mar. 19, 2015, 10 pages.
Martens et al., "Training Deep and Recurrent Networks with Hessian-Free Optimization," In Neural Networks: Tricks of the Trade (NIPS), Lecture Notes in Computer Science, (LNCS) vol. 7700, Springer, Berlin, Germany, Dec. 1, 2012, 58 pages. (https://pdfs.semanticscholar.org/9c72/0db62b95b7cbcb9772b56edffb13d1df749a.pdf).
Pascanu et al., "Revisiting Natural Gradient for Deep Networks," pp. 1-18. arXiv:1301.3584v7.
Pearlmutter, Barak A., "Fast Exact Multiplication by the Hessian," The Massachusetts Institute of Technology Press Journals, Neural Computation, vol. 6, Issue 1, Jan. 1994, 13 pages.
Polyak et al., "Acceleration of Stochastic Approximation by Averaging," Society for Industrial and Applied Mathematics Journal on Control and Optimization. vol. 30, Issue 4, Jul. 1992, pp. 838-855. (http://www.meyn.ece.ufl.edu/archive).
Qian, Ning, "On the Momentum Term in Gradient Descent Learning Algorithms," Neural Networks, vol. 12, Issue 1, 1999, pp. 145-151. (https://pdfs.semanticscholar.org/735d/4220d5579cc6afe956d9f6ea501a96ae99e2.pdf).
Recht et al., "Hogwildi: A Lock-Free Approach to Parallelizing Stochastic Gradient Descent," Advances in Neural Information Processing Systems 24, Papers published at the Neural Information Processing Systems Conference, Jun. 28, 2011, 9 pages.
Roux et al., "Topmoumoute Online Natural Gradient Algorithm," in Advances in Neural Information Processing Systems 20 (NIPS 2007) Papers published at the Neural Information Processing Systems Conference, Dec. 3, 2007, 8 pages.
Schraudolph, Nicol N., "Fast Curvature Matrix-Vector Products for Second-Order Gradient Descent," The Massachusetts Institute of Technology Press Journal, Neural Computation, vol. 14, Issue 7, Jul. 2002, pp. 1723-1738. (https://www.mitpressjournals.org/doi/pdf/10.1162/08997660260028683) Jul. 2002.
Sutskever et al., "On the Importance of Initialization and Momentum in Deep Learning," In Proceedings of the 30th International Conference on Machine Learning (ICML), Atlanta, Georgia, USA, Jun. 16-21, 2013, 14 pages.
Takac et al., "Mini-Batch Primal and Dual Methods for SVMs," Proceedings of the 30th International Conference on Machine Learning (ICML) Atlanta, GA USA, Journal of Machine Learning Research (JMLR), Mar. 10, 2013, pp. 1-12 arXiv:1303.2314v1.
Yuan, Y, "On the Truncated Conjugate Gradient Method," Mathematical Programming, Series A, vol. 87, Issue 3, Nov. 30, 1999, pp. 561-573.
Zhang et al., "Deep Learning with Elastic Averaging SGD," Advances in Neural Information Processing Systems 28 (NIPS 2015), Papers published at the Neural Information Processing Systems Conference, Oct. 25, 2015, pp. 1-9 arXiv:1412.6651v8.

\* cited by examiner

BLOCK-DIAGONAL HESSIAN-FREE OPTIMIZATION FOR RECURRENT AND CONVOLUTIONAL NEURAL NETWORKS

PRIORITY APPLICATION DATA

This application claims priority to Application No. 62/508,372 filed on May 18, 2017, which is incorporated by reference in its entirety.

TECHNICAL FIELD

The disclosure generally relates to training a neural network and more specifically to training the neural network using a second order derivative with a block-diagonal Hessian-free optimization.

BACKGROUND

Optimizing neural networks with second order derivatives is advantageous over optimizations that use first-order gradient descent. This is because an optimization that uses second order derivatives includes better scaling for large mini-batch sizes and requires fewer updates for convergence. However, conventionally, neural networks are not trained using second order derivatives because of a high computational cost and a need for model-dependent algorithmic variations.

Accordingly, there is a need for training neural networks with second order derivatives that are efficient, allow for parallel training, and do not incur high computational cost.

Figure 1:
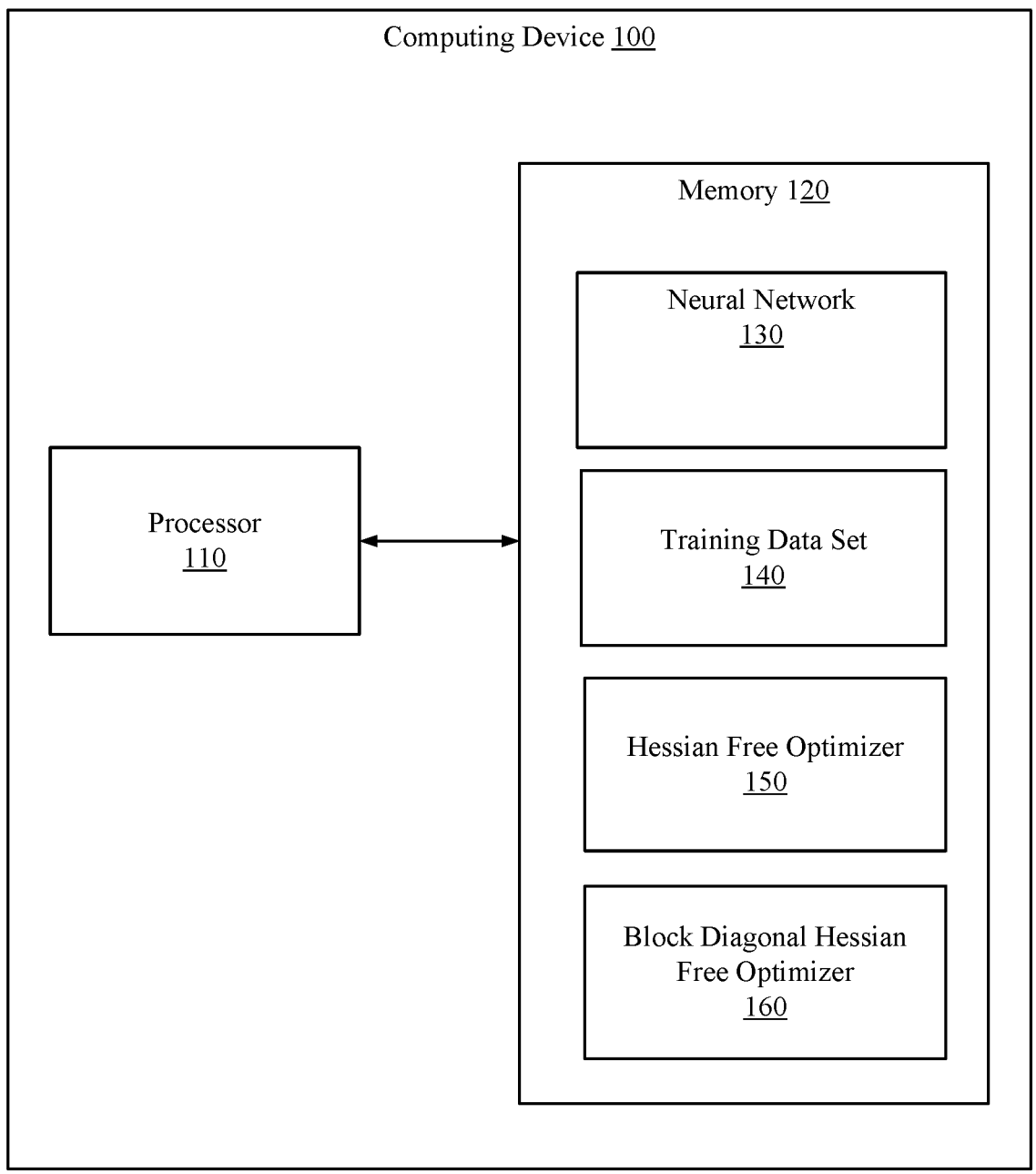
FIG. 1 is a simplified diagram of a computing device, according to some embodiments.

In the figures, elements having the same designations have the same or similar functions.

DETAILED DESCRIPTION

Neural networks have shown success in computer vision and natural language processing tasks. However, in order for the neural networks to process tasks, the neural networks are trained using first-order optimization methods, such as a stochastic gradient descent and its variants. These first-order optimization methods, however, may not incorporate curvature information about the objective loss function and may result in slow convergence. Another drawback to the first-order optimization methods is that these methods process data in small mini-batches. Because the first-order optimization methods process data in small mini-batches, processing the mini-batches in parallel to train the neural network may be difficult and computationally expensive.

Unlike first-order optimization methods, second order optimization methods may take advantage of relationships between weights (also referred to as parameters) in a neural network in a form of the off-diagonal terms of a Hessian matrix or another curvature matrix. A Hessian matrix may be a square matrix of the second order partial derivatives of a scalar valued function. In some embodiments, optimization methods that use second order derivatives make use of more information about the local structure of the objective loss function because the second order derivatives approximate the loss function quadratically, and not linearly.

However, finding an analytical minimum of a quadratic approximation of the objective loss function for a neural network may not be feasible. This is because a neural network that has "N" number of weights or parameters, may generate an N×N Hessian matrix or another curvature matrix. Because the neural network may have thousands of weights, performing operations, such as inverting the N×N matrix that is required to determine a minimum quadratic approximation of the objective loss function may be computationally expensive.

In some embodiments, the Hessian-free methods may minimize a quadratic approximation of the objective loss function by locally approximating the loss using a conjugate gradient ("CG") method. The conjugate gradient method evaluates a sequence of curvature-vector products instead of explicitly inverting or computing the Hessian matrix or another curvature matrix.

In some embodiments, the Hessian or another curvature matrix-vector product may be computed using one forward pass and one backward pass through the network. In some embodiments, a forward pass through the network may have data input at the input layer of the neural network and end at the output layer of the neural network, while a backward pass may begin at an output layer of the neural network and end the input layer of the neural network.

In some embodiments, Hessian-free optimization methods may require hundreds of curvature-gradient iterations for one update. As such, training a neural network using second order optimization methods may be more computationally expensive than training the neural network using first order optimization methods.

To train a neural network using second order optimization methods, the embodiments below use a block-diagonal approximation of a Hessian matrix or curvature matrix and not the Hessian free or curvature matrix. The block-diagonal approximation of the Hessian or curvature matrix includes divides consecutive layers of the neural network into blocks, and trains the blocks independently of other blocks. This is advantageous because, the weights or parameters in each block may have gradients that are independent of gradients of weights or parameters in other blocks. Because the Hessian or curvature matrix is divided into blocks that correspond to independent subsets of weights or parameters, the second-order derivative optimization becomes separable, less complex, and less computationally intensive because the optimization may be computed in parallel.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities. In some examples, memory 120 may include non-transitory, tangible, machine readable media that includes executable code that when run by one or more processors (e.g., processor 110) may cause the one or more processors to perform the counting methods described in further detail herein.

As illustrated in FIG. 1, memory 120 may include a neural network 130. Neural network 130 may be implemented using hardware, software, and/or a combination of hardware and software. In some embodiments, neural network 130 may be a convolutional neural network.

In some embodiments, neural network 130 may generate a result when data is passed through neural network 130. For example, neural network 130 may recognize an object in an image submitted as input to neural network 130, determine a word or words based on a sequence of sound submitted as input, and/or the like.

Figure 2A:
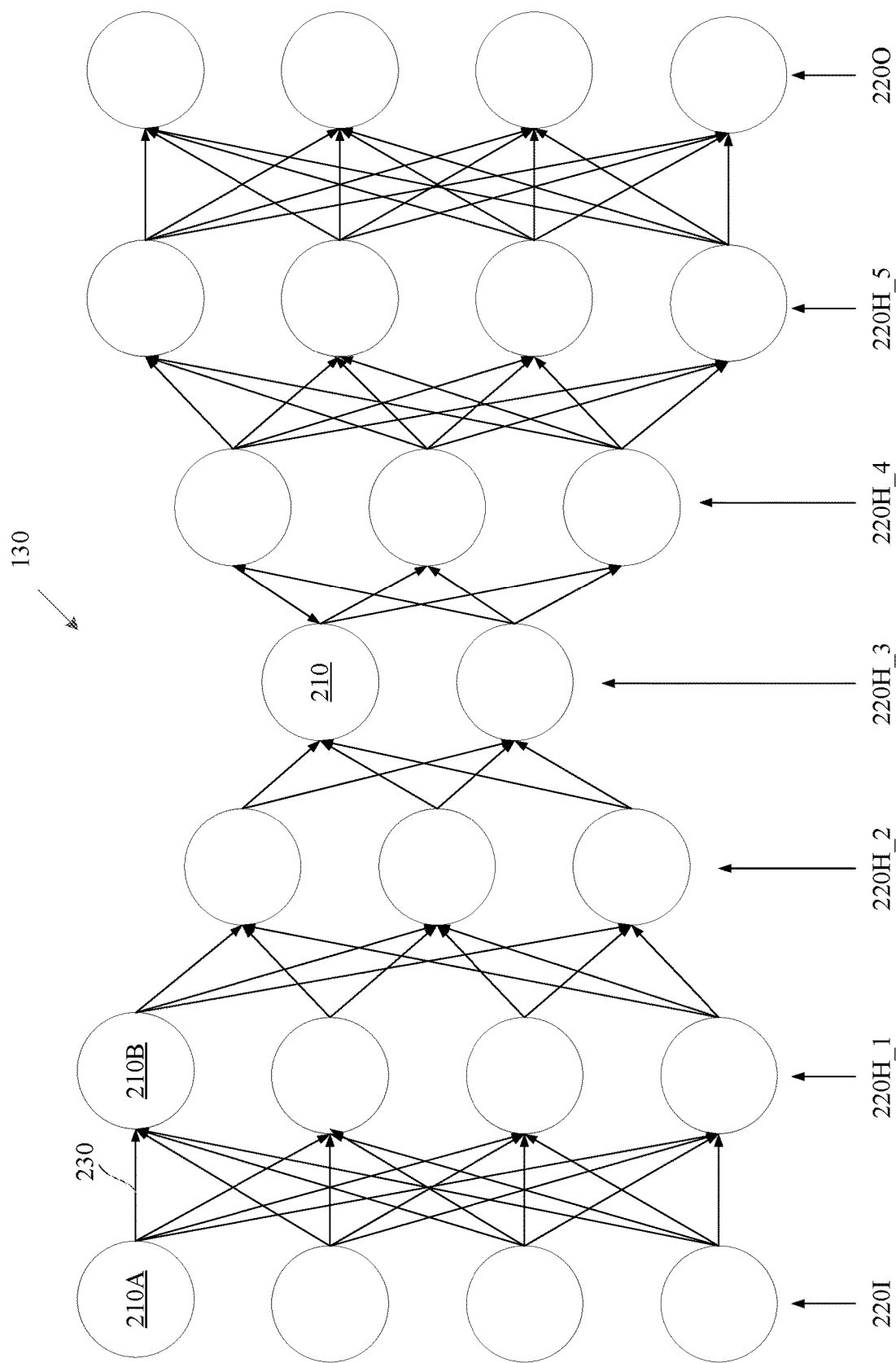
FIGS. 2A-2B are simplified diagrams of a neural network, according to some embodiments.

FIG. 2A is a block diagram 200 of a neural network, according to some embodiments. As illustrated in FIG. 2A, neural network 130 may be a structure of nodes 210. The vertical columns of nodes 210 may be referred to as layers, such as layers 220. Nodes 210 from different layers 220 may be connected using multiple links 230. In embodiment, each node 210, such as node 210B in layer 220H_1 may be connected to all nodes 210 in a preceding layer 220I subsequent layer 220H_2.

In some embodiments, neural network 130 may include an input layer 220I, one or more hidden layers 220H, such as layers 220H_1 through 220H_5, and an output layer 220O. Nodes 210 included in input layer 220I may receive input data, such as an image or audio described above. When nodes 210 in input layer 220I receive data, nodes 210 may apply weights (or parameters) to the input data by, for example, multiplying the input data by the value of the weight or a function that includes the weight and optionally adding a bias. Once nodes 210 apply weights to the data, nodes 210 in input layer 220I may pass the weighted input data to the subsequent hidden layer, such as hidden layer 220H_1. Nodes 210 in hidden layers 220H_1-220H_5 may also apply weights to the data received from previous nodes 210. For example, nodes 210 in hidden layer 220H_1 may apply weights to data received from nodes 210 of input layer 220I. In another example, nodes 210 in hidden layer 220H_4 may apply weights to data received from nodes 210 of hidden layer 220H_3.

As the weighted data travels through neural network 130, the weighted data may reach an output layer 220O. Output layer 220O may receive the weighted data from nodes 210 of the last hidden layer, such as hidden layer 220H_5. In some embodiments, output layer 220O may provide data that is an output or result of neural network 130.

Going back to FIG. 1, in order for neural network 130 to generate an expected output for a set of input data, neural network 130 may be trained. For example, in order for neural network 130 to recognize an object in an image as a cat or a dog, the neural network 130 may be trained on images that are known to be those of a cat or a dog. In some embodiments, the training of neural network 130 may involve determining values for weights or parameters for links 230 that are associated with each node 210 in neural network 130. Once neural network 130 is trained, neural network 130 may have weights or parameters for links 230 at each node 210 that may generate a correct output for data that passes through neural network 130. For example, neural network 130 that is trained to recognize images, should identify an image that includes a dog, as an image with the dog, and not another animal, such as a cat.

In some embodiments, neural network 130 may be trained using a training data set 140. Training data set 140 may be a set of data that may serve as input to neural network 130 for which an output data set is known. During training, various training techniques may determine the values for weights or parameters for links 230 at each node 210.

In some embodiments, training data set 140 that is input to neural network 130 may be labeled (x, y), the output of neural network 130 may be labeled f(x, w) or alternatively f(x, w, b), and the loss function labeled as l(y, f(x, w)) or alternatively l(y, f(x, w, b) where "w" refers to the network parameters or weights flattened to a single vector and "b" is a bias. In some embodiments, the loss function may indicate a summation of errors when training data in training data set 140 was passed through neural network 130 generated an incorrect output that varies from ground truth results expected for the training data in training data set 140.

In some embodiments, memory 120 may include a Hessian free optimizer 150 and a block diagonal Hessian free optimizer 160. Processor 110 may train neural network 130 by executing Hessian free optimizer 150 and block diagonal Hessian free optimizer 160.

In some embodiments, when Hessian free optimizer 150 trains neural network, Hessian free optimizer 150 may determine weights or parameters of nodes 210 included in neural network 130. To determine the weights, Hessian free optimizer 150 may determine a change in "w", or "w" and "b" when a bias is used (generically referred to as $\Delta w$) that minimizes a local quadratic approximation $q(w+\Delta w)$ of the objective loss function $l(\cdot)$ at point w:

$$q(w+\Delta w):=l(w)+\Delta w^T \nabla l(w)+\tfrac{1}{2}\Delta w^T G(w)\Delta w \quad \text{(Equation 1)}$$

where $G(w)$ is a curvature matrix for the objective loss function $l(\cdot)$ at point "w". In some embodiments, $G(w)$ may be a Hessian matrix or a generalized Gauss-Newton matrix, "T" indicates matrix transposition of $\Delta w$, and $\nabla l(w)$ may be a gradient of the objective loss function $l(\cdot)$ at "w". In some embodiments, a gradient of a function may be a slope of a tangent of the function at "w" with a magnitude in the direction of the greatest rate of increase of the function.

In some embodiments, Equation 1 may be represented as:

$$\arg\min_{\Delta w} \Delta w^T \nabla l + \frac{1}{2}\Delta w^T G \Delta m \quad \text{(Equation 2)}$$

and solved for minimal Δw using a conjugate gradient. In some embodiment, a solution may be generated using a conjugate gradient. Use of conjugate gradients is described in more detail in a paper titled "A Brief Introduction to the Conjugate Gradient Methods", by Runar Heggelien Refsnaes (2009). In some embodiments, conjugate gradient causes Hessian free optimizer 150 to evaluate a series of matrix-vector products Gv, instead of evaluating the curvature matrix G. This is because, determining curvature matrix G may be computationally expensive because of a large number of weights that are included in neural network 130 and represented in the curvature matrix G.

There may be multiple ways to solve for the matrix-vector product Gv given a computation graph representation of an objective loss function l. In some embodiments where the curvature matrix "G" is a Hessian matrix "H", Equation 1 becomes a second order Taylor expansion, and the Hessian-vector product "Hv" may be computed as a gradient of a directional derivative of the objective loss function l in the direction of "v". Accordingly, "Hv" may be determined using the L- and $R_v$-operators $L\{\bullet\}$ and $R_v\{\bullet\}$, such that:

$$Hv = \frac{\partial^2 l}{\partial^2 w} v = \nabla_w(v^T \nabla_w l) = L\{R_v\{l(w)\}\} \quad \text{(Equation 3)}$$

In some embodiments, L- and $R_v$-operators represent forward and backward traversals of neural network 130. The $R_v$-operator may be implemented in a forward traversal of the neural network 130, while the L-operator may be implemented in a backward traversal of neural network 130. For example, the $R_v$-operator may implement a forward traversal by sending data from input layer 220I to output layer 220O of neural network 130. As the data travels through neural network 130, functions that are or include weights or parameters are applied to the data at links 230 that project from each node 210. Once the data modified by the functions reaches the output layer 220O, neural network 130 generates a result. In some embodiments, the output result may be compared to the expected ground truth result to determine loss.

In another example, the L-operation may implement a reverse traversal of neural network 130 by transmitting the loss from output layer 220O to input layer 220I. As the loss travels from output layer 220O to input layer 220I, the L-operator may determine a gradient of a function at each node 210. To determine the gradient, the L-operator may generate a derivative of the function "f" used at the node 210, and chain the derivatives at each node according to a chain rule. A chain rule is a formula for determining a derivative for a composition of two or more functions, and is known in the art.

In an alternative embodiment, the Hessian free optimizer 150 may also compute a Hessian-vector product "Hv" as a gradient of the dot product of a vector and the gradient.

In some embodiments, Hessian free optimizer 150 may compute the curvature matrix "G" using a Gauss-Newton matrix as a substitute for the curvature matrix. The Gauss Newton matrix may be positive and semi-definite if the objective loss function is expresses as the composition of two functions l(f(w)) with function l being convex. Typically, neural network 130 training objectives satisfy the convex property.

In some embodiments, for a curvature mini-batch of data $S_c$ (which may be a subset of training data set 140), a Gauss-Newton matrix may be defined as:

$$G := \frac{1}{|Sc|} \Sigma_{(x,y) \in Sc} J^T H_l J \quad \text{(Equation 4)}$$

where J is a Jacobian matrix of derivatives of neural network outputs with respect to the parameters $$J := \frac{\partial f}{\partial w}$$

and $H_l$ is a Hessian matrix of the objective loss function with respect to the neural network outputs $$H_l = \frac{\partial^2 l}{\partial^2 f}.$$

In some embodiments, $H_l$ may be an approximation of a Hessian matrix that results from dropping terms that involve second derivative of function "f".

In some embodiments, the Gauss-Newton vector product Gv may also be evaluated using a combination of L- and $R_v$-operators, where $L\{v^T\bullet\}$ may be written as $L\{\bullet\}$:

$$Gv = (J^T H_l J)v = \nabla_f(w^T \nabla_w((v^T \nabla_w f)^T \nabla_f)) = L_w\{L\{R_{R_v\{f(w)\}}\{l(f)\}\}\} \quad \text{(Equation 5)}$$

Figure 2B:
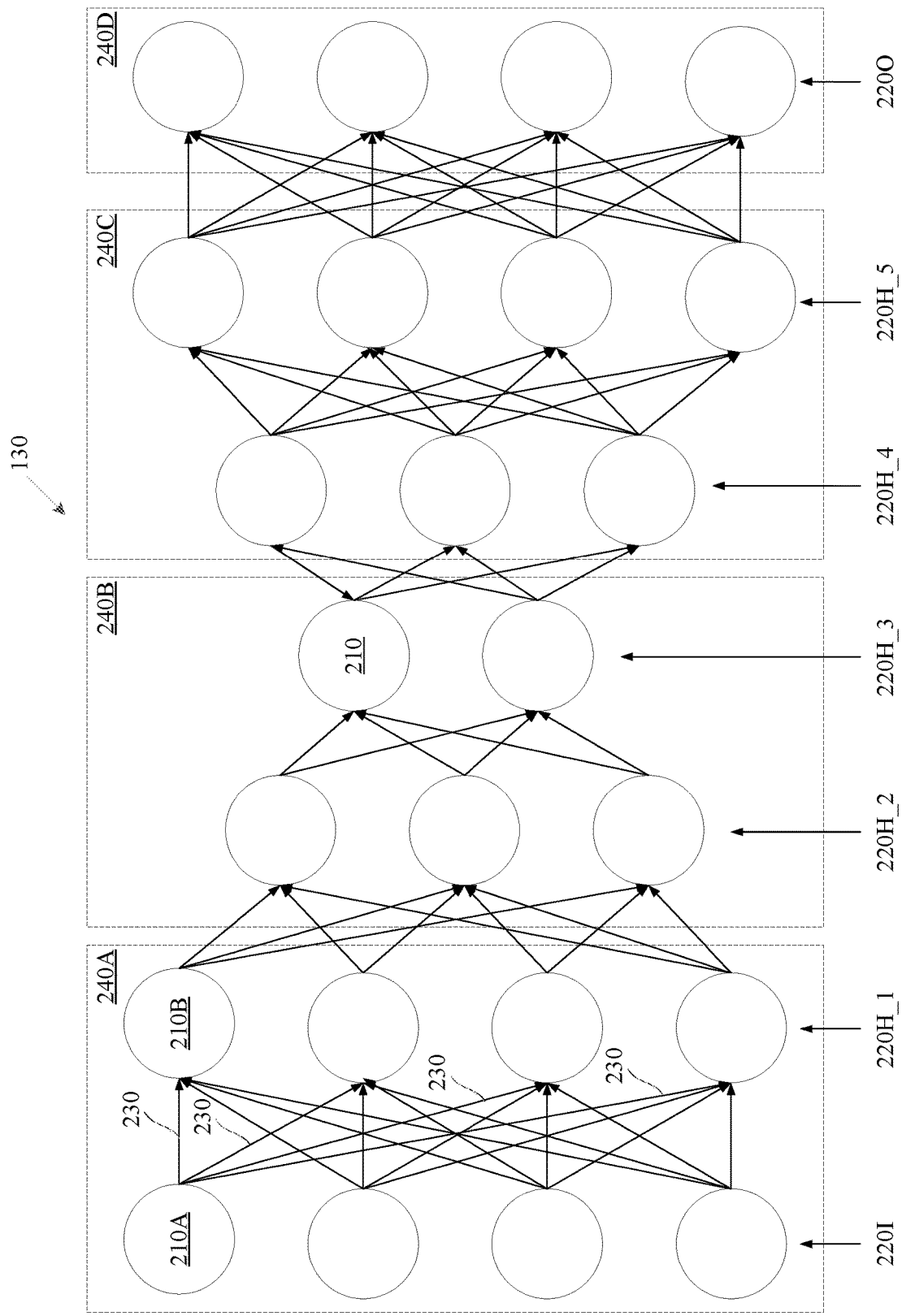

In some embodiments, block diagonal Hessian free optimizer 160 may also be used to train neural network 130 and determine weights for one or more nodes 210. In some embodiments, block diagonal Hessian free optimizer 160 may split neural network 130 into one or more blocks. FIG. 2B is a block diagram of a neural network split into blocks, according to an embodiment. Like FIG. 2A, neural network 130 in FIG. 2B includes multiple nodes 210 and layers 220I, 220H_1-220H_5 and 220O. In some embodiments, nodes in layer 220I receive data in training data set 140, and nodes in layer 220O generate an output that results from passing the data in training data set 140 through neural network 130.

In some embodiments, block diagonal Hessian free optimizer 160 may divide neural network 130 into blocks 240, such as blocks 240A-D. There may be one or more adjacent layers 220 in each block 240. In some embodiments, a number of layers 220 in block 240 may depend on the properties of neural network 130. For example, an auto-encoder neural network may include two blocks 240, one block for an encoder and another block for a decoder. In a multilayer long short-term memory neural network, each layer 220 with recurrent nodes 210 may be included in a single block 240. In a convolutional neural network, blocks 240 may include a configurable number of layers 220, such as three consecutive layers 220.

In some embodiments, block diagonal Hessian free optimizer 160 may determine a Δw for weights or parameters in each block 240 independently from other blocks 240. In this way, block diagonal Hessian free optimizer 160 may determine the Δw for weights in block 240A in parallel with blocks 240B, 240C and 240D.

To determine the Δw for in blocks 240A-D, block diagonal Hessian free optimizer 160 may modify a Hessian matrix described above. The Hessian matrix may be an "N" by "N" matrix, where "N" is a total number of weights in neural network 130. Hessian matrix may contain second derivatives of the loss of neural network 130 with respect to each pair of weights or parameters.

In some embodiments, block diagonal Hessian free optimizer 160 uses a Hessian matrix to determine weights for links 230 coming out of nodes 210 within each block 240 independent and in parallel with other blocks 240. To determine weights of each block 240 in parallel, block diagonal Hessian free optimizer 160 may generate a block diagonal Hessian matrix by setting certain terms in the matrix to zero. For example, in the block diagonal Hessian matrix the second order derivatives that correspond to the pair of weights from different blocks may be set to zero.

In some embodiments, block diagonal Hessian free optimizer 160 may also use similar techniques to generate a block diagonal Gaussian Newton matrix. For example, block diagonal Hessian free optimizer 160 may set some second order derivatives in the Gaussian Newton matrix to zero. Typically, these second order derivatives may correspond to the pairs of weights or parameters from different blocks 240 in neural network 130.

Figure 3:
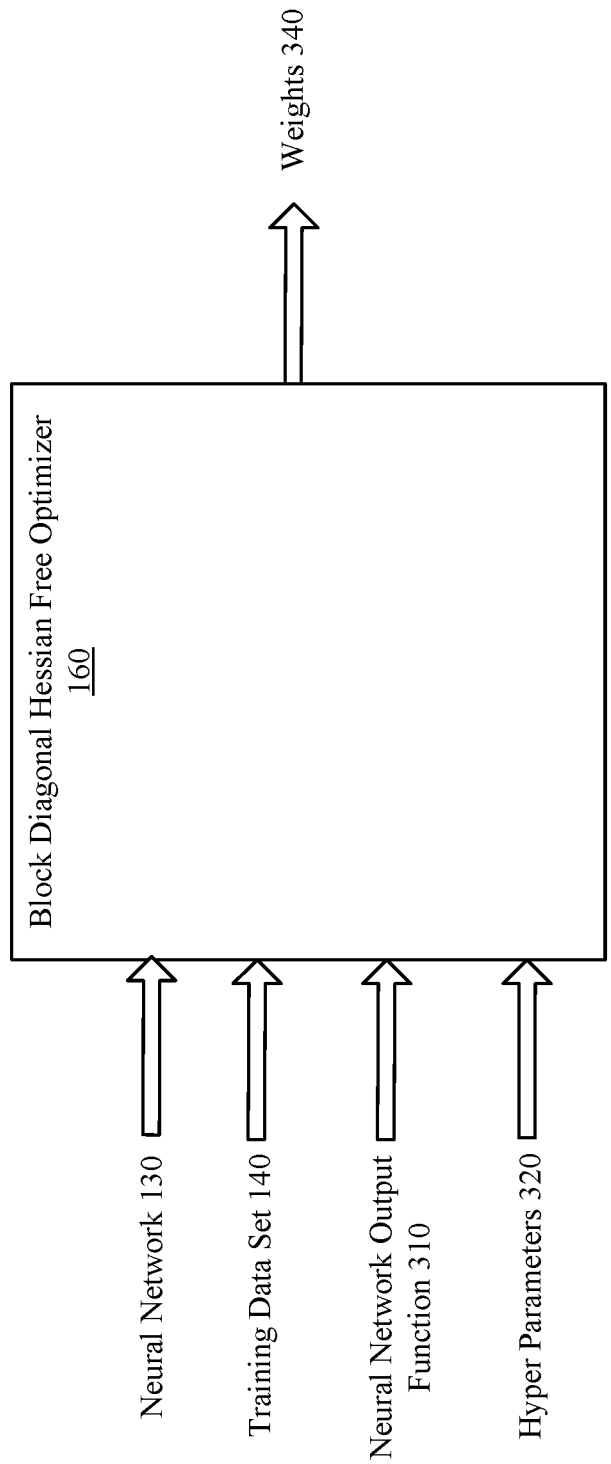
FIG. 3 is a block diagram of a block diagonal Hessian free optimizer, according to an embodiment.

FIG. 3 is a block diagram of a block diagonal Hessian free optimizer 160, according to an embodiment. As illustrated in FIG. 3, block diagonal Hessian free optimizer 160 receives neural network 130, training data set 140, neural network output function $z_i = f(x_i, w)$ with parameters or weights "w" and a loss function $l(z_i, y_i)$ (referred to as neural network output function 310), and hyper parameters 320. In some embodiments the output of block diagonal Hessian free optimizer 160 may be weights 340 for links 230 associated with nodes 210 of neural network 130.

In some embodiments, hyper parameters 320 may include a maximum number of loops parameter. The maximum number of loops parameter may identify the maximum number of iterations that block diagonal Hessian free optimizer 160 may perform to determine weights 340.

In some embodiments, hyper parameters 320 may include a maximum conjugate gradient iteration parameter. The maximum conjugate gradient iteration parameter may indicate a maximum number of iterations that may occur to identify a $\Delta w$.

In some embodiments, hyper parameters 320 may include a conjugate gradient stop criterion. The conjugate gradient stop criterion may indicate a threshold after which the $\Delta w$ may be too small to require further computations.

In some embodiments, hyper parameters 320 may include a learning rate $\alpha$ parameter. The learning rate $\alpha$ parameter indicates a coefficient by which a $\Delta w$ may be multiplied before the change in weight is added to the weight vector "w".

In some embodiments, after block diagonal Hessian free optimizer 160 receives neural network 130, training data set 140, neural network output function 310, and hyper parameters 320, block diagonal Hessian free optimizer 160 may divides layers 220I, 220H_1-220H_5, and 220O of neural network 130 into a "B" number of blocks 240. Example blocks 240A-D for which B=4 are shown in FIG. 2B.

In some embodiments, block diagonal Hessian free optimizer 160 may assign a vector of weights "w(i)" to each block 240, where "i" is an integer from one to "B". In this way, block diagonal Hessian free optimizer 160 may represent all weights "w" in neural network 130 as:

$$w = [w_{(1)}, w_{(2)}; \ldots ; w_{(B)}]$$

In some embodiments, block diagonal Hessian free optimizer 160 may determine the values for the weights "w" in neural network 130, by iterating the steps described below from one to the value in the maximum number of loops parameter.

In the first step, block diagonal Hessian free optimizer 160 may determine a gradient mini-batch $S_g \subset S_T$ where $S_T$ is training data set 140. The mini-batch $S_g$ may be used to determine a gradient vector "g(i)" for each block 240, where "i" is a number from one to B. The gradient "g" for all blocks 240 may be represented as:

$$g = [g_{(1)}, g_{(2)}; \ldots ; g_{(B)}]$$

To determine the gradient "g(i)", block diagonal Hessian free optimizer 160 may use the L-operator to forward propagate mini-batch $S_g$ from input layer 220I to 220O of neural network 130. Block diagonal Hessian free optimizer 160 may then determine the loss by comparing the output of neural network 130 to the expected output. Next, block diagonal Hessian free optimizer 160 may use the $R_v$-operator to back propagate the derivatives of the loss from output layer 220O to input layer 220I. By back propagating the derivatives from the loss, block diagonal Hessian free optimizer 160 may determine the derivatives of the loss with respect to the parameters, which are the gradient "g(i)".

In the second step, block diagonal Hessian free optimizer 160 may generate a curvature mini-batch $S_c \subset S_g$ to determine a curvature vector product, such as Hv or Gv, described in Equations 3 or 5 above. In an embodiment, to determine the curvature vector product using mini-batch $S_c$, block diagonal Hessian free optimizer 160 passes mini-batch $S_c$ through different parts of neural network 130. In one embodiment, block diagonal Hessian free optimizer 160 may split neural network 130 into two parts. The first part may include input layer 220I and hidden layers 220H_1 through 220H_5. The second part may include output layer 220O. Next, block diagonal Hessian free optimizer 160 may perform forward and back traversals over the first and second parts of neural network 130 to compute the curvature vector product.

In an embodiment, block diagonal Hessian free optimizer 160 may vary the size of mini-batch $S_g$ and mini-batch $S_c$. In one embodiment, mini-batch $S_c$ may be a smaller size than mini-batch $S_g$. In another embodiment, mini-batch $S_g$ may include the entire training data set 140, and mini-batch $S_g$ may be a subset of training data set 140. In yet another embodiment, mini-batch $S_g$ and mini-batch $S_c$ may include different data from training data set 140.

In the third step, block diagonal Hessian free optimizer 160 may use the gradient $g = [g_{(1)}, g_{(2)}; \ldots ; g_{(B)}]$ and curvature vector product, such as Gv or Hv to determine a conjugate gradient as discussed above.

In the fourth step, block diagonal Hessian free optimizer 160 may use the conjugate gradient iterations to determine a $\Delta w$ for each node 210 in each block 240. The iterations may repeat until either the value in the maximum conjugate gradient iteration parameter or the value for $\Delta w_{(b)}$ is below the conjugate gradient stop criteria. In some embodiments the equation for determining a minimum $\Delta w_{(b)}$ may be as follows:

For $b = 1, \ldots, B$ solve $\arg\min_{\Delta w_{(b)}} \Delta w_{(b)}^T \nabla_{(b)}] + \frac{1}{2} \Delta w_{(b)}^T G_{(b)} w_{(b)}$ (Equation 6)

As discussed above, the equation above may determine $\Delta w_{(b)}$. In some embodiments, the $\Delta w$ for all blocks $b = 1, \ldots B$ may be represented as $[\Delta w_{(1)}, \Delta w_{(2)}; \ldots ; \Delta w_{(B)}]$.

In some embodiments, block diagonal Hessian free optimizer 160 may perform the conjugate gradient iterations on each block 240 in parallel with other blocks. This is because block diagonal Hessian free optimizer 160 may add a constraint of $\Delta w_{(j)}=0$ for integer $j \notin (b)$. In this way, the values in the curvature matrix G are set to zero for terms that are not in $G_{(b)}$. In other words, the values in the curvature matrix G are non-zero for values in the matrix that correspond to weights or parameters pairs that are within the same block 240, but are zero for values in the curvature matrix that correspond to the weight or parameter pairs from different blocks 240. In this way, block diagonal Hessian free optimizer 160 replaces the curvature matrix Gv or Hv with a block-diagonal approximation of the curvature matrix, reduces the search space for the conjugate gradient, and ensures that the gradient of the weights inside one block 240 is independent from the gradients of the weights in other blocks 240.

In some embodiments, block diagonal Hessian free optimizer 160 may solve the arg $\min_{\Delta w(b)} \Delta w_{(b)}^T \nabla_{(b)}] + \frac{1}{2} \Delta w_{(b)}^T G_{(b)} w_{(b)}$ equation for blocks 240 for b=1 to B using the conjugate gradient and block diagonal Hessian free optimizer 150 described above.

Once block diagonal Hessian free optimizer 160 determines the change in weights $[\Delta w_{(1)}, \Delta w_{(2)}; \ldots ; \Delta w_{(B)}]$ for blocks 240 by meeting either the maximum number of conjugate gradient parameters or the conjugate gradient stop criterion, block diagonal Hessian free optimizer 160 may proceed to the fifth step. In the fifth step, block diagonal Hessian free optimizer 160 may aggregate the changes in weights $[\Delta w_{(1)}, \Delta w_{(2)}; \ldots ; \Delta w_{(B)}]$ for blocks 240 into the $\Delta w$ vector that includes the changes for all weights in neural network 130:

$$\Delta w \leftarrow [\Delta w_{(1)}, \Delta w_{(2)}; \ldots ; \Delta w_{(B)}] \quad \text{(Equation 7)}$$

In some embodiments, block diagonal Hessian free optimizer 160 may use the $\Delta w$ vector to update the value for weights w (weights 340 in FIG. 3) with the $\Delta w$ that may be multiplied by the learning rate $\alpha$:

$$w \leftarrow w + \alpha \Delta w \quad \text{(Equation 8)}$$

In some embodiments, because block diagonal Hessian free optimizer 160 determines weights 340 of nodes 210 using independent blocks 240, block diagonal Hessian free optimizer 160 reduces the dimensionality of the search space that the curvature gradient considers. Further, although block diagonal Hessian free optimizer 160 may solve a B number of sub-problems to determine the change in weights $[\Delta w_{(1)}, \Delta w_{(2)}; \ldots ; \Delta w_{(B)}]$ each sub-problem may be smaller in size, involves fewer conjugate gradient iterations to determine the change in the weights for the sub-problem, and may be performed in parallel with other sub-problems. Accordingly, block diagonal Hessian free optimizer 160 may use similar amount of computer resources from computing device 100 as the Hessian free optimizer 150 using a Hessian free matrix the size of the largest sub-problem. Further, if block diagonal Hessian free optimizer 160 executes each sub-problem in parallel and on multiple computing devices in a distributed system, block diagonal Hessian free optimizer 160 has a potential of providing an improvement over the performance of Hessian free optimizer 150 by a power of B, where B is a number of blocks 240 in neural network 130.

Figure 4:
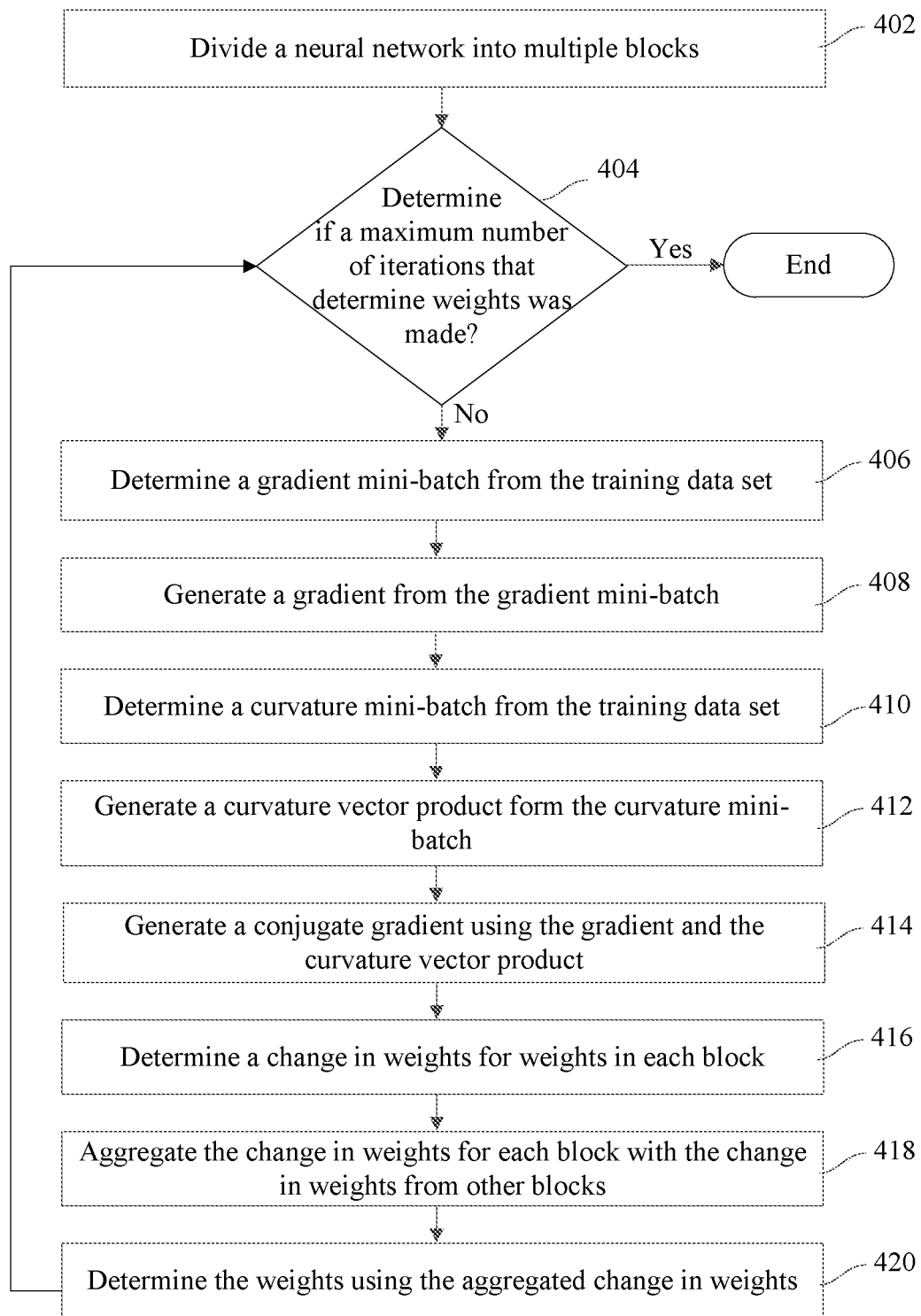
FIG. 4 is a flowchart of a method for training a neural network, according to some embodiments.

FIG. 4 is a simplified diagram of a method 400 for training a neural network, according to some embodiments. One or more of the processes 402-420 of method 400 may be implemented, at least in part, in the form of executable code stored on non-transitory, tangible, machine-readable media that when run by one or more processors may cause the one or more processors to perform one or more of the processes 402-420.

At operation 402, a neural network is divided into multiple blocks. As discussed above, block diagonal Hessian free optimizer 160 may divide layers 220 of neural network 130 into blocks 240. In some embodiments, blocks 240 may be approximately the same size and include one or more consecutive layers 220.

At operation 404, a determination whether a maximum number of iterations to determine the weights was made. For example, block diagonal Hessian free optimizer 160 may determine if a number of iterations that determine weights 340 has reached a maximum number of loops parameter. If no, then method 400 proceeds to operation 406. If yes, method 400 ends and weights 340 are incorporated into neural network 130.

At operation 406, a gradient mini-batch is determined. As discussed in the first step above, block diagonal Hessian free optimizer 160 may determine a gradient mini-batch $S_g$ from training data set 140.

At operation 408, a gradient is generated. For example, block diagonal Hessian free optimizer 160 may generate the gradient "g" by passing data in mini-batch $S_g$ forward and backward in neural network 130.

At operation 410, a curvature mini-batch is determined. As discussed in the second step above, block diagonal Hessian free optimizer 160 may determine a curvature mini-batch $S_c$ from training data set 140.

At operation 412, a curvature vector product is generated. As discussed in the second step described above, block diagonal Hessian free optimizer 160 generates a curvature vector product Gv or Hv from the curvature mini-batch $S_c$.

At operation 414, a conjugate gradient is generated. As discussed in the third step described above block diagonal Hessian free optimizer 160 may use the gradient "g" and the curvature vector product Gv or Hv to determine a conjugate gradient.

Figure 5:
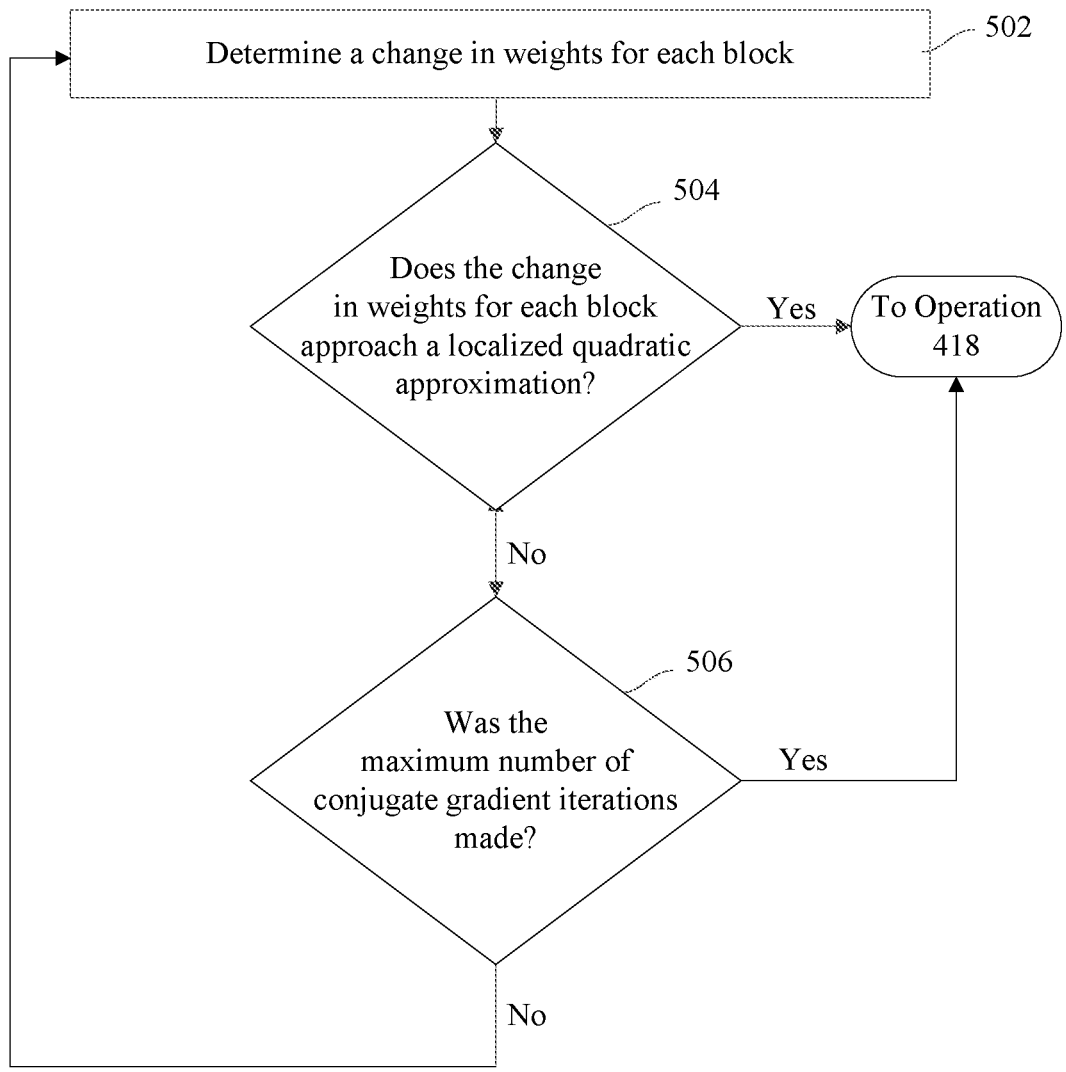
FIG. 5 is a flowchart of a method for determining a change in weights for each block, according to some embodiments.

At operation 416, a change in weights for the weights in each block is determined. FIG. 5 is a flowchart that describes how block diagonal Hessian free optimizer 160 uses the conjugate gradient iterations to determine a change in weights for the weights in each block 240 according to some embodiments. This is also described in step four above. In some embodiments, operation 416 for each block 240 may be performed in parallel with other blocks 240. FIG. 5 is described below.

At operation 418, the aggregated change in weights is determined. As discussed above, the changes in weights for each block 240 may be aggregated with the change of weights from other blocks 240.

At operation 420, the weights in neural network are determined. For example, block diagonal Hessian free optimizer 160 may generate weights 340 for neural network 130 using the aggregated change in weights that are multiplied by a learning rate $\alpha$ and added to the weights from the previous iterations of steps 404-420. Next, the flowchart proceeds to operation 404.

FIG. 5 is a simplified diagram of a method 500 for determining a change in weights for each block, according to some embodiments. One or more of the processes 502-506 of method 500 may be implemented, at least in part, in the form of executable code stored on non-transitory, tangible, machine-readable media that when run by one or more processors may cause the one or more processors to perform one or more of the processes 502-506.

At operation 502, a change in weights for each block is determined. For example, block diagonal Hessian free optimizer 160 may determine a change in weights by solving equation $\arg\min_{\Delta w_{(b)}} \Delta w_{(b)}^T \nabla_{(b)}] + \frac{1}{2}\Delta w_{(b)}^T G_{(b)} G_{(b)} w_{(b)}$ for each block 240 where b=1, ..., B. With respect to FIG. 2B, block diagonal Hessian free optimizer 160 may determine the change in weights for block 240A, change in weights for block 240B, change in weights for block 240C, and change in weights for block 240D. Further, block diagonal Hessian free optimizer 160 may use the block diagonal Hessian matrix or block diagonal Gauss-Newton matrix to determine the change in weights instead of the Hessian free or Gauss-Newton matrix. As discussed above, in the block diagonal Hessian matrix or block diagonal Gauss-Newton matrix the values that correspond to weight pairs from different blocks 240 are set to zero. This reduces the search space the conjugate gradient may need to consider to determine the change in weights for the weights in each block 240. This further allows block diagonal Hessian free optimizer 160 to determine the change in weights for the weights in each block 240 in parallel with other blocks 240.

At operation 504, a determination whether a change in weights for each block approaches a localized quadratic approximation of the objective loss function is made. This may occur when the conjugate gradient stop criteria is met. If the conjugate gradient parameter is met, the further change of weight computations may generate a change of weights that is below a configurable threshold and may not be worth the computations resources of computing device 100, and method 500 proceeds to operation 418. Otherwise, method 500 proceeds to operation 506.

At operation 506, a determination whether a maximum number of conjugate gradient iterations was made. If block diagonal Hessian free optimizer 160 made the maximum number of conjugate gradient iterations, the flowchart proceeds to operation 418. Otherwise, the flowchart proceeds to operation 502.

Figure 6A:
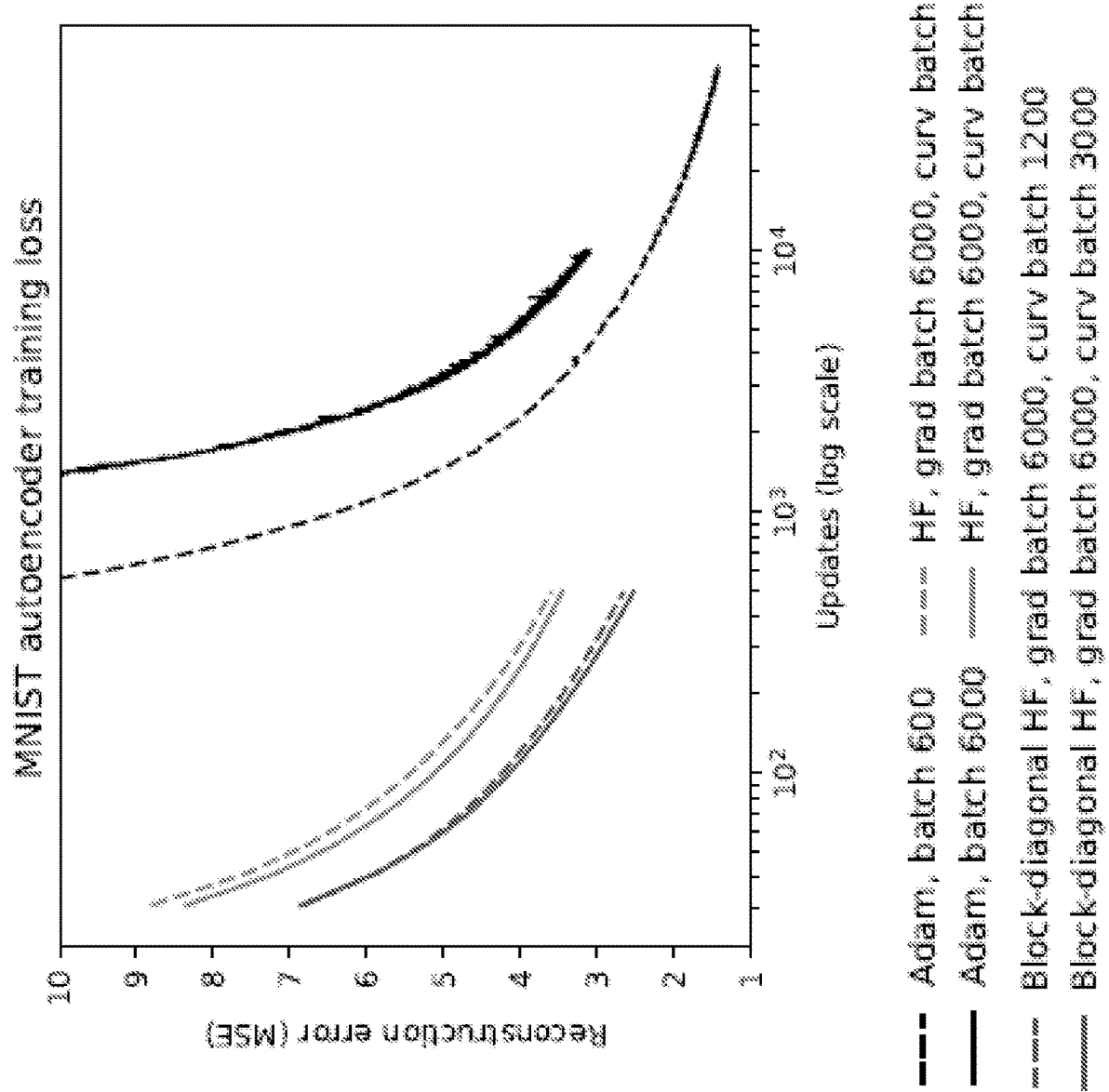
FIGS. 6A and 6B show a performance comparison between a conventional Adam optimizer, Hessian free optimizer, and block diagonal Hessian free optimizer, according to some embodiments.
Figure 6B:
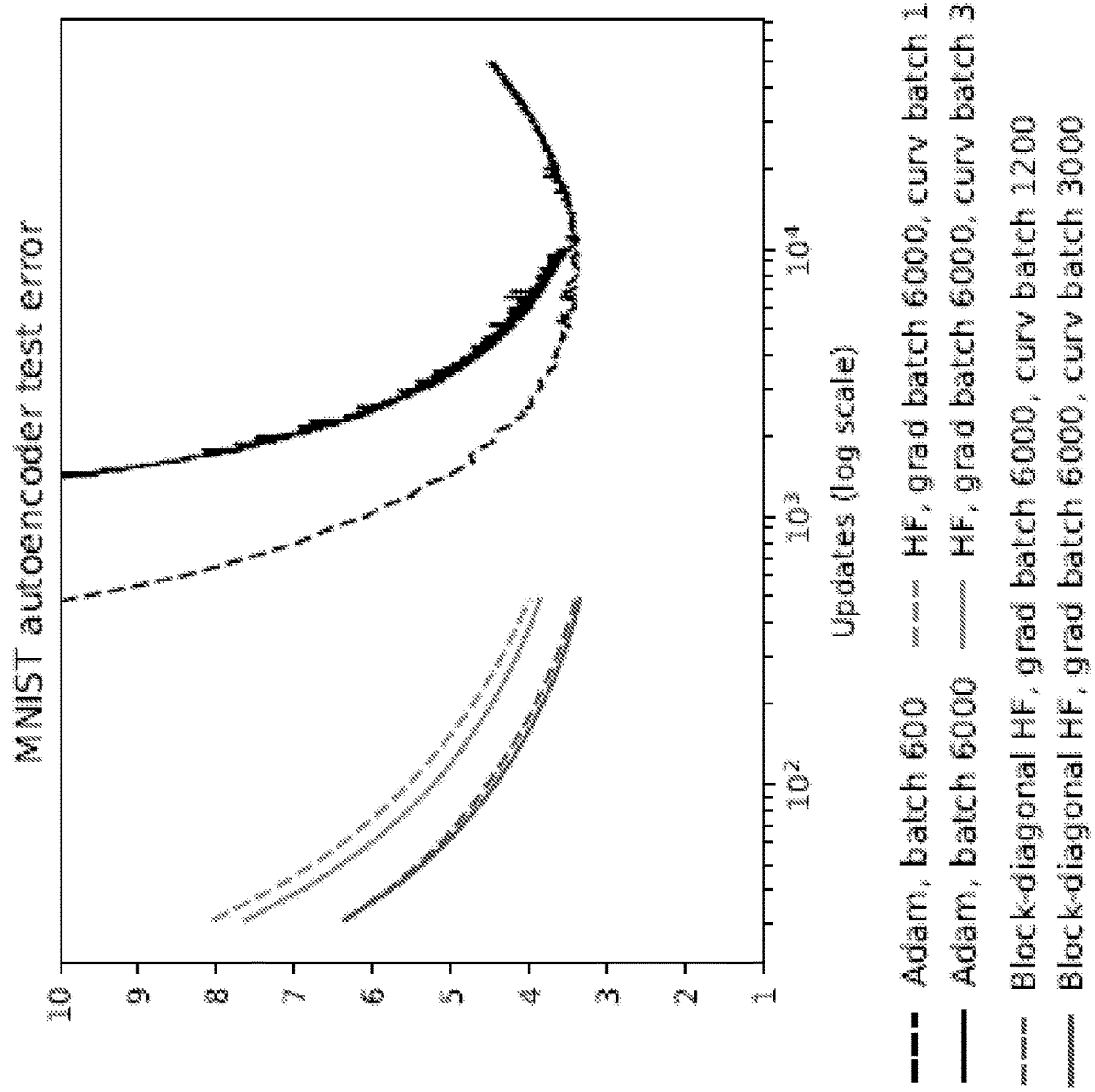

FIGS. 6A and 6B are simplified diagrams of training performance using different training methods to train a deep auto encoder neural network, according to some embodiments. The purpose of neural network autoencoder is to learn a low-dimensional representation or encoding of data from an input distribution. The autoencoder may have an encoder component and a decoder component. The encoder component maps the input data to a low-dimensional vector representation and the decoder component reconstructs the input data given the low-dimensional vector representation. The autoencoder is trained by minimizing the reconstruction error.

In an embodiment, the input data set may be composed of handwritten digits of size 28×28. The input data set may also include 60,000 training samples and 10,000 test samples.

In an embodiment, the autoencoder may be composed of an encoder component with three hidden layers and state size 784-1000-500-250-30, followed by a decoder component that is a mirror image of the encoder component. Further, the embodiments use a "tan h" activation function and the mean squared error loss function.

In an embodiment, autoencoder may be trained using a conventional Adam optimizer, Hessian free optimizer 150, and block-diagonal Hessian free optimizer 160. For training using Hessian free optimizer 150 and block diagonal Hessian free optimizer 160, the hyperparameters may include a fixed learning rate of 0.1, no damping, and maximum conjugate gradient iterations set to 30. Further the block diagonal Hessian free optimizer 160 may divide the autoencoder into two blocks, one block for the encoder component and the other block for the decoder component. The conventional Adam optimizer may have the learning rate of 0.001, $\beta_1=0.9$, $\beta_2=0.999$, and $\varepsilon=1\times10^{-8}$.

FIGS. 6A and 6B show a performance comparison between the conventional Adam optimizer, Hessian free optimizer 150, and block diagonal Hessian free optimizer 160. For the conventional Adam optimizer, the number of data set epochs needed to converge and the final achievable reconstruction error were heavily affected by the mini-batch size, with a similar number of updates required for small mini-batch and large mini-batch training. As illustrated in FIG. 6B, block diagonal Hessian free optimizer 160 training using a large mini-batch size has approximately the same reconstruction error as the conventional Adam optimizer trained using small mini-batches. Further, block diagonal Hessian free optimizer 160 has an order of magnitude fewer updates to converge compared to the conventional Adam optimizer with either small or large mini-batches. Further, FIGS. 6A and 6B illustrate that block diagonal Hessian free optimizer 160 consistently provides better reconstruction error on both the training and test data sets than the Hessian free optimizer 150 over the entire course of training. This advantage of block diagonal Hessian free optimizer 160 holds across different values of the curvature mini-batch size.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for training a neural network to process a task, the system comprising:
   a memory;
   a processor coupled to the memory;
   a block diagonal Hessian free optimizer stored in the memory and implemented using the processor, the block diagonal Hessian free optimizer configured to:
   divide layers of the neural network into a first block and a second block, wherein the first block has first adjacent layers of the layers and the second block has second adjacent layers of the layers;
   generate a gradient from a gradient mini-batch included in the training data;
   generate a block diagonal Hessian matrix of curvature-vector products from curvature mini-batches included in the training data, the block diagonal Hessian matrix corresponding to parameter pairs in the neural network, first pairs in the pairs including at least one first parameter of the first block and at least one second parameter of the second block, second pairs in the pairs including two of the at least one first parameter, and third pairs in the pairs including two of the at least one second parameter; and
   set curvature-vector products in the block diagonal Hessian matrix to zero for one or more terms that correspond to pairs associated with parameters from different blocks;
   generate a first conjugate gradient for the first block from the gradient and the curvature-vector products in the block diagonal Hessian matrix and a second conjugate gradient for the second block;

determine, using the first conjugate gradient a change in the at least one first parameter of the first block; and determine, using the second conjugate gradient a change the in at least one second parameter of the second block.

2. The system of claim 1, wherein the block diagonal Hessian free optimizer is further configured to determine the change in the at least one first parameter in parallel with determining the change in the at least one second parameter.

3. The system of claim 1, wherein a size of the first block and a size of second block depend on characteristics of the neural network.

4. The system of claim 1, wherein the block diagonal Hessian free optimizer is further configured to iteratively determine the change in the at least one first parameter until the change is below a conjugate gradient stop criterion.

5. The system of claim 1, wherein the block diagonal Hessian free optimizer is further configured to determine the change in the at least one first parameter until the block diagonal Hessian free optimizer performs a maximum number of conjugate gradient iterations.

6. The system of claim 1, wherein the curvature mini-batch is smaller than the gradient mini-batch.

7. The system of claim 1, wherein the block diagonal Hessian free optimizer is further configured to determine the change in the at least one first parameter by solving:

$$arg\ min_{\Delta w_{(b)}} \Delta w_{(b)}^T \nabla_{(b)} l + \frac{1}{2}\Delta w_{(b)}^T G_{(b)} w_{(b)} \text{ and}$$

wherein b is the first block, l is a loss function, and G is a block diagonal Hessian matrix, and $\Delta w_{(b)}$ is the change in the at least one first parameter.

8. The system of claim 1, wherein the block diagonal Hessian free optimizer is further configured to identify a type of the neural network; and identify the first adjacent layers for the first block and the second adjacent layers for the second block based on the type of the neural network.

9. The system of claim 1, wherein the task processed using the trained neural network analyses a natural language processing task.

10. The system of claim 1, wherein the task processed using the trained neural network is a computer vision task.

11. A method for training a neural network, the method comprising:

identifying, using a block diagonal Hessian free optimizer stored in memory of a computing device, a first block and a second block from non-overlapping layers the neural network, wherein the first block has first adjacent layers of the layers and the second block has second adjacent layers of the layers;

generating a gradient from a gradient mini-batch included in training data;

generating a block diagonal Hessian matrix of curvature-vector products from curvature mini-batches included in the training data, wherein data in the gradient mini-batch is different from data in the curvature mini-batch and wherein the block diagonal Hessian matrix corresponds to parameter pairs in the neural network, first pairs in the pairs including at least one first parameter of the first block and at least one second parameter of the second block, second pairs in the pairs including two of the at least one first parameter, and third pairs in the pairs including two of the at least one second parameter;

setting curvature-vector products in the block diagonal Hessian matrix to zero values for one or more terms that correspond to pairs that include parameters from different blocks;

generating a first conjugate gradient for the first block from the gradient and the curvature-vector products in the block diagonal Hessian matrix and a second conjugate gradient for the second block in parallel with the first conjugate gradient;

determining, using the first conjugate gradient a change in the at least one first parameter of the first block; and determining, using the second conjugate gradient a change in the at least one second parameter of the second block.

12. The method of claim 11, further comprising:

determine the change in the at least one first parameter in parallel with determining the change in the at least one second parameter.

13. The method of claim 11, where a size of the first block and size of a second block depend on characteristics of the neural network.

14. The method of claim 11, further comprising:

determine the change in the at least one first parameter until the change is below a conjugate gradient stop criterion.

15. The method of claim 11, further comprising:

determining the change in the at least one first parameter until the block diagonal Hessian free optimizer performs a maximum number of conjugate gradient iterations.

16. The method of claim 11, wherein the curvature mini-batch is smaller than the gradient mini-batch.

17. The method of claim 11, further comprising:

determining the change in the at least one first parameter by solving:

$$arg\ min_{\Delta w_{(b)}} \Delta w_{(b)}^T \nabla_{(b)} l + \frac{1}{2}\Delta w_{(b)}^T G_{(b)} w_{(b)} \text{ and}$$

wherein b is the first block, l is a loss function, and G is a block diagonal curvature matrix, and $\Delta w_{(b)}$ is the change in the at least one first parameter.

18. A non-transitory machine-readable medium having stored thereon machine-readable instructions executable to cause a machine to perform operations that train a neural network, the operations comprising:

identifying, using a block diagonal Hessian free optimizer stored in memory of a computing device, a first block and a second block from layers in the neural network, wherein the first block has first adjacent layers of the layers of the neural network and the second block has second adjacent layers of the layers of the neural network;

generating a gradient from a gradient mini-batch included in training data;

generating a curvature-vector product from a curvature mini-batch included in the training data;

generating a conjugate gradient from the gradient and the curvature-vector product;

determining, using the conjugate gradient a change in at least one first parameter of the first block;

determining, using the conjugate gradient a change in at least one second parameter of the second block; and determining the at least one first parameter in the first block using the at least one first parameter and the change in the at least one first parameter, and the at least one second parameter in the second block using the at least one second parameter and the change in the at least one second parameter.

19. The non-transitory machine-readable medium of claim 18, wherein the machine-readable instructions executable to cause the machine to perform operations comprising determining the change in the at least one first parameter by solving:

$$\arg\min_{\Delta w_{(b)}} \Delta w_{(b)}^T \nabla_{(b)} l + \tfrac{1}{2} \Delta w_{(b)}^T G_{(b)} w_{(b)} \text{ and}$$

wherein b is the first block, l is a loss function, and G is a block diagonal Hessian matrix, and $\Delta w_{(b)}$ is the change in the at least one first parameter.

20. The non-transitory machine-readable medium of claim 18, wherein the curvature-vector product is a block diagonal Hessian matrix of curvature-vector products corresponding to parameter pairs in the neural network, first pairs in pairs including the at least one first parameter of the first block and the at least one second parameter of the second block, second pairs in pairs including two of the at least one first parameter, and third pairs in pairs including two of the at least one second parameter and wherein the second pairs are set to zero.

* * * * *